United States Patent

[11] 3,577,006

[72] Inventors Leo A. Tyrrell
Marion;
Daniel E. Castleberry, Cedar Rapids;
Charles A. Weber, Marion, Iowa
[21] Appl. No. 805,497
[22] Filed Mar. 10, 1969
[45] Patented May 4, 1971
[73] Assignee Collins Radio Company
Cedar Rapids, Iowa

[54] FAIL-SAFE PULSED LOGIC AND GATE

3 Claims, 2 Drawing Figs.

[52] U.S. Cl. .................................................... 307/218, 307/243, 307/254, 307/270, 328/94
[51] Int. Cl. .................................................... H03k 19/08, H03k 19/22
[50] Field of Search .................................................... 307/269; 307/218; 317/27; 328/94

[56] References Cited

UNITED STATES PATENTS 2,963,594 12/1960 Bruce .......................... 207/218
3,217,181 11/1965 Zuk .......................... 307/218
3,253,186 5/1966 Rogers .......................... 331/113
3,421,018 1/1969 Martin .......................... 307/218
3,508,078 4/1970 Komaniya .......................... 307/218

*Primary Examiner*—Donald D. Forrer
*Assistant Examiner*—Harold A. Dixon
*Attorneys*—Warren H. Kintzinger and Robert J. Crawford

ABSTRACT: A DC logic handling fail-safe pulsed logic AND gate circuit capable of warning the user whenever substantially any single catastrophic component failure occurs inhibiting any of the functions a DC logic circuit is required to perform. It is a multiple input AND gate circuit with the inputs repeatedly pulsed to develop a resulting pulsed output when no input signals are inhibited and there are no circuit disorders within the gate circuit. Biasing circuits within the gate circuit are so subject to bias voltage variation with a signal input inhibit or internal circuit disorder as to inhibit the pulse signal output and thereby warn.

Figure 1:
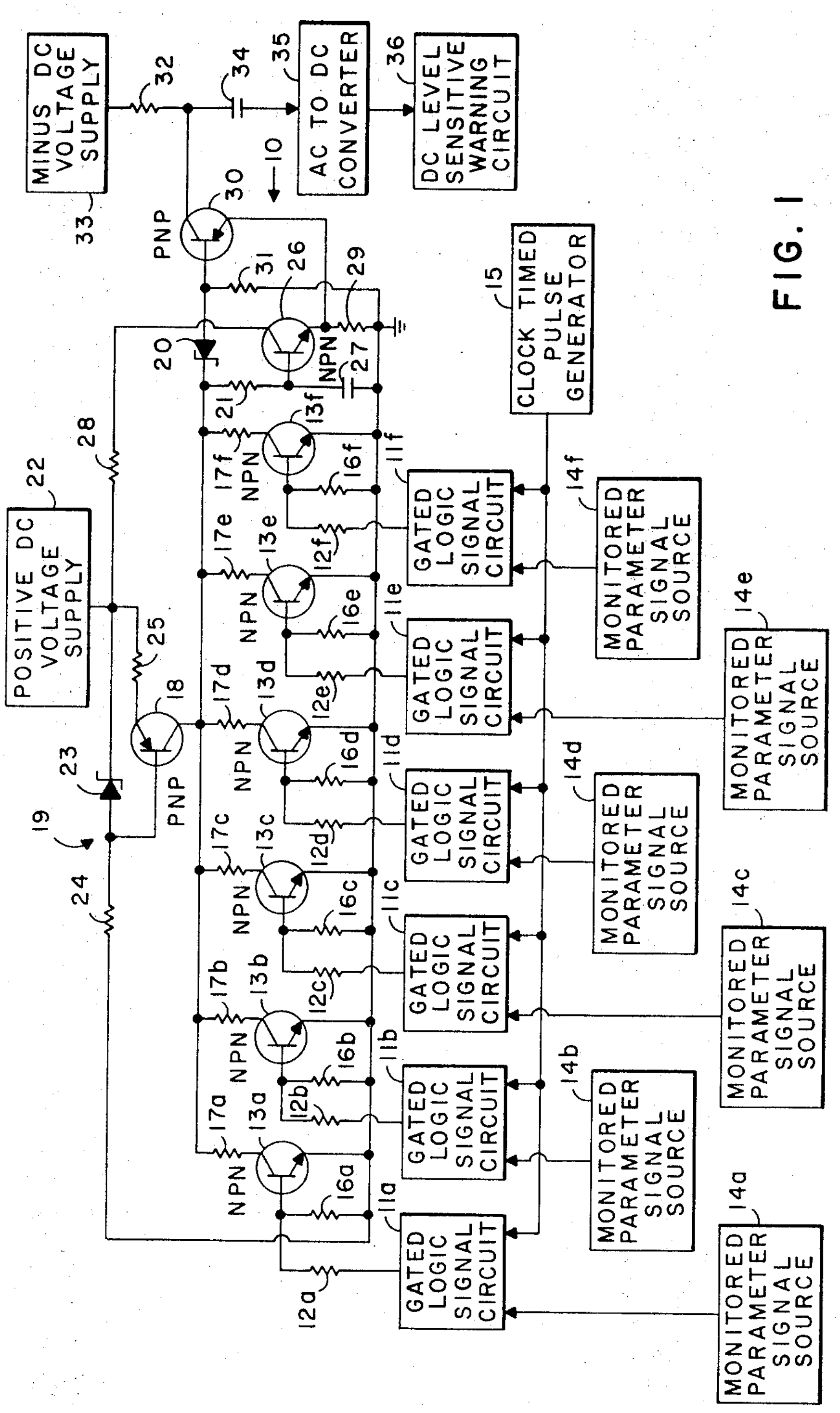

INVENTORS.
LEO A. TYRRELL
DANIEL E. CASTLEBERRY
CHARLES A. WEBER
BY Warren H. Kintzinger
ATTORNEY INVENTORS.
LEO A. TYRRELL
DANIEL E. CASTLEBERRY
CHARLES A. WEBER
BY Warren H. Kintzinger
ATTORNEY

FAIL-SAFE PULSED LOGIC AND GATE

This invention relates in general to logic circuits, and in particular, to a DC logic handling fail-safe pulsed logic AND gate circuit.

With many existing DC logic systems there are various failure modes that may occur from time to time under various operational states without any flag or other failure indication thereof for the user. Such undetected DC logic circuit inoperativeness occurrences can prove disastrous, and, at best, if they occur at all, particularly without detection, lessen confidence of the user in such DC logic systems.

It is, therefore, a principal object of this invention to provide a fail-safe pulsed logic AND gate circuit for use with DC logic circuitry.

Another object with such a pulsed logic AND gate circuit is to detect substantially all failure modes of DC logic and enhance the validity of DC logic circuit signal outputs.

Features of this invention useful in accomplishing the above objects include, in a DC logic multiple signal handling fail-safe pulsed logic AND gate circuit, a plurality of parallel input connected transistor gates normally biased to conduction in the quiescent state. This establishes parallel current paths from a DC current source to ground through load resistors thereby developing a resulting voltage such as to, through application to an output signal transistor circuit, result in biasing of the output transistor to conduction. Then simultaneous pulsing of the inputs to a voltage value driving all the parallel input transistor gates to cut off results in the DC derived voltage developed being increased sufficiently to open a threshold bias activated circuit path in the output transistor circuit and drive the output transistor into the cutoff state and thereby develop an output pulse in synchronous with the pulsing of the inputs for a no warn state of operation. If one of the input logic transistors is not switched off during the pulse period enough current is shunted from the supply to prevent pulse off activation of the output transistor to thereby give warning via a warning circuit. Conversely, if one of the input logic transistors fails to be biased to conduction through a quiescent period between pulses the equivalent parallel resistance of the load to the current source is increased to result again in no switch-off of the output transistor with pulsing of the inputs to again thereby give warning.

A specific embodiment representing what is presently regarded as the best mode of carrying out the invention is illustrated in the accompanying drawings.

Figure 2:
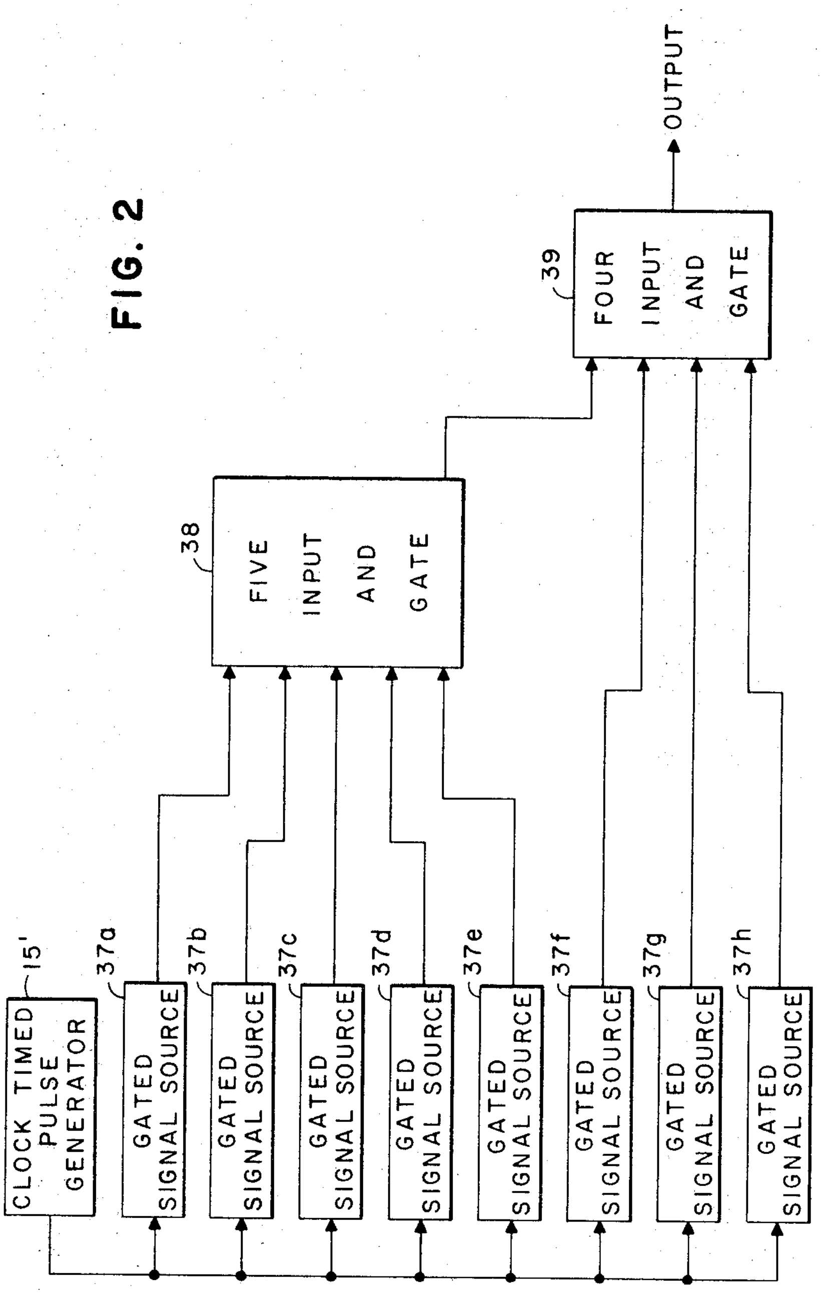

In the drawings:

FIG. 1 represents a schematic and block diagram of a DC logic handling fail-safe pulsed logic AND gate system; and FIG. 2, a block diagram of a cascaded utilization of such fail-safe multiple input fail-safe pulsed logic AND gates.

The DC logic handling fail-safe pulsed logic AND gate circuit 10, of FIG. 1, is shown to have a plurality of input connections from gated logic signal circuits 11a through 11f individually, respectively, through resistors 12a through 12f to the bases of NPN transistors 13a through 13f. The gated logic signal circuits 11a through 11f receive inputs from monitored parameter signal sources 14a through 14f, respectively, and also, simultaneously, timed pulse inputs from clock-timed pulse generator 15, that in one working embodiment hereof supplies a pulse with a width of approximately 130 microseconds at a pulse repetition rate of 140 hertz. Please note that this effectively pulses all the monitoring gated signal circuits 11a through 11f simultaneously from an elevated voltage to zero with the elevated voltage indications being monitored by the AND gate circuit 10 particularly designed to sense the presence of these gating to zero voltage pulses. The emitters of the NPN transistors 13a through 13f are connected directly to ground, and the bases in addition to the input connections thereto are also connected through resistors of PNP a through 16f, respectively, to ground. The collectors thereof are connected through collector load resistors 17a through 17f, respectively, to the collector of PNP transistor 18 of current source circuit 19, to the cathode of Zener diode 20 and to resistor 21. The current source circuit 19 includes connection of a positive DC voltage supply 22 to the cathode of Zener diode 23 and serially on through the Zener diode and resistor 24 to ground, and also, from the positive DC voltage supply 22 a connection through resistor 25 to the emitter of PNP transistor 18 the base of which is connected to the junction of the anode of Zener diode 23 and resistor 24. The other end of resistor 21, from the common junction of the collector of PNP transistor 18, Zener diode 20, and the resistors 17a through 17f, is connected both to the base of NPN transistor 26 and through capacitor 27 to ground. The collector of NPN transistor 26 is connected through resistor 28 to the positive DC voltage supply 22, and with transistor 26 functioning as an emitter follower with the emitter connected both through resistor 29 to ground and also directly to the emitter of PNP transistor 30. The base of PNP transistor 30 is connected to the anode of Zener diode 20 and also through resistor 31 to ground. The collector output of PNP transistor 30 is connected both through resistor 32 to minus DC voltage supply 33 and also through output signal pulse-coupling capacitor 34 to the AC to DC converter circuit 35 for developing a DC output signal applied as an input to DC level sensitive warning circuit 36.

The AND gate circuit 10 has been implemented, as a variable collector load for current source 19, the latter comprised of PNP transistor 18, Zener diode 23, and resistors 25 and 24. The DC logic quiescent state inputs to transistors 13a—13f are sufficient to drive the respective transistors 13a through 13f into the saturated state. The collector load resistors 17a through 17f are of substantially equal value so that the current provided by PNP transistor 18, other than for current drain through resistor 21 and Zener diode 20, is divided substantially equally between the load resistors 17a through 17f. This is with the voltage developed at the collector of PNP transistor 18 being determined by the current supplied from the PNP transistor 18 via the collector electrode thereof, and generally, the equivalent parallel resistance of the load resistors 17a through 17f other than for the current drain that may exist via circuit paths through resistor 21 and Zener diode 20. This results in the quiescent voltage developed at the junction of capacitor 27 and resistor 21, being essentially the same as that on the collector of PNP transistor 18 except that it is a little lower because of the base current for NPN transistor 26 being drawn through the resistor 21.

The NPN transistor 26 functions as an emitter follower with the output thereof driving the emitter of PNP transistor 30. The voltage on the base of PNP transistor 30 is generally lower than the voltage developed at the collector of PNP transistor 18 by a voltage amount equal to the base emitter drops of PNP transistor 30 and NPN transistor 26 plus the voltage drop through resistor 21. The components of the circuit are so value selected and the voltage supplies are of such DC voltage levels that the circuit voltages developed during the quiescent state generally leave Zener diode 20 biased below breakdown to therefore function essentially as a nonconductive circuit path element. Thus, it follows that the quiescent state base current of PNP transistor 30 is determined by the value of resistors 21 and 31, the emitter-base resistances of transistors 26 and 30, and the voltage generated at the collector of PNP transistor 18. This results in the DC collector output from PNP transistor 30 being high since the transistor is repeatedly biased to the saturated state under quiescent operational conditions between gating pulses of the gated logic signal circuits 11a through 11f as determined by clock-timed pulse generator 15. When in the operational state, all of the logic inputs are pulsed from normally a predetermined substantially equal positive voltage level to zero volts simultaneously the current provided from the collector of PNP transistor 18 is diverted from its normal quiescent state path. As this occurs, the voltage on capacitor 27 at the junction of resistor 21, capacitor 27, and the base of NPN transistor 26 remains essentially constant with, as a result, the emitter of PNP transistor 30 being maintained at a substantially constant voltage potential level. The voltage developed at the collector of PNP transistor 18 builds up until the Zener diode 20 breaks down to the conductive state and the current drain from the collector of PNP transistor 18 is in large measure channeled through resistor 31 to ground. With this action, the current through the resistor 31 replaces the quiescent base current of PNP transistor 30 to thereby bias the PNP transistor 30 to the cutoff state with, as a result, a negative going output pulse appearing at the collector of the PNP transistor 30.

The presence of this pulse constitutes a "no warn" state as far as the overall AND gate circuit is concerned and whenever the pulse is missing, the gate could be considered as being warned. Pulse-detecting means could be provided that would give warning actuation with one missing pulse. However, in the embodiment shown, the output is fed through signal coupling capacitor 34 to an AC to DC converter 35 which requires a series of missing pulses to develop an output DC voltage warning level such as to activate the DC level sensitive warning circuit 36.

Please not that there are two primary warning modes of operation for the AND gate circuit with a first mode being when one of the input logic transistors fails to switch off during the pulse period. When this happens, the respective individual load resistor, whichever of load resistors 17*a* through 17*f* associated with that particular gate, remains grounded and shunts current from the collector of PNP transistor 18. The remaining current flow through resistor 31 is then insufficient to switch PNP transistor 30 from the saturated to conduction state and, as a result, no negative pulse is developed at the collector of the output PNP transistor 30.

The second primary warning mode comes into being when one of the input DC logic transistors 13*a* through 13*f* fails to remain in the saturated to conductive state through the quiescent periods of operation. Under such a state of operation with one of the transistors 13*a* in 13*f* not biased to conduction through the quiescent state, the equivalent parallel resistance of the load presented to the collector of PNP transistor 18 increases to thereby, as a result, increase the quiescent state voltage developed at the collector of PNP transistor 18. This higher voltage results in an increase of the quiescent state base current through PNP transistor 30 to such a level that the current available from PNP transistor 18 during the subsequent pulse period is, as a result, insufficient to subsequently switch transistor 30 off. This thereby again results in the loss of output pulses from the collector of PNP transistor 30 and thereby activates the warn state therefore.

Please not that while the specific AND gate embodiment of FIG. 1 utilized a six input AND gate, the number of logic inputs ANDed in this manner may be fewer or more as may be appropriate with greater number logic AND gated circuit embodiments being limited only as determined by the tolerances of components involved and the perimeter margins that may be permissible for the specific installations. A six input AND gate much in accord with the embodiment of FIG. 1 has been adapted for use in a radio altimeter with very gratifying, excellent operational results. This is with signal inputs from monitored perimeter signal sources being converted through the gated logic signal circuits to a predetermined positive voltage level of plus 30 volts through the quiescent intervals of operation between pulses generated by the clock-timed pulse generator 15 that induces pulse interruption drops to zero Voltage as pulse signal inputs to the AND gate transistors 13*a* through 13*f* with the zero pulses having a width of approximately 130 microseconds at a pulse repetition rate of 140 hertz.

Components and values used in a DC logic handling fail-safe pulsed logic AND gate much as used in a radio altimeter in accord with the embodiment of FIG. 1 include the following:

| | |
|---|---|
| Resistors 12*a*—12*f* | 100 K Ohms |
| NPN transistor 13*a*—13*f* and 26 | 2N956 |
| Resistors 16*a*—16*f* | 47 K Ohms |
| Resistors 17*a*—17*f* | 9.09 K Ohms |
| PNP transistors 18 and 30 | 2N2907A |
| Zener diodes 20 and 23 | 1N751A 5.1 volts |
| Resistor 21 | 10 K Ohms |
| Positive DC voltage supply 22 | +30 volts |
| Resistor 24 | 22 K Ohms |
| Resistors 25 and 28 | 680 Ohms |
| Capacitor 27 | 1.0 $\mu f$ |
| Resistor 29 | 56 K Ohms |
| Resistor 31 | 1430 Ohms |
| Resistor 32 | 18 K Ohms |
| Minus DC voltage supply 33 | −30 volts |
| Capacitor 34 | 100 pf. |

Please note that such DC logic handling fail-safe pulsed logic AND gate circuitry may be adapted for the use of PNP transistors in place of NPN transistors and vice versa along with the use of consistent DC voltage supply polarities and a consistent operationally suitable combination of circuit component values in obtaining the operational results required. As had been pointed out hereinbefore, such AND gates may have a different number of logic inputs than is the case with the six logic input AND gate of FIG. 1, for example, five input and four input AND gates such as employed in combination in the showing of FIG. 2. In this illustration, a clock-timed pulse generator 15′ pulse activates gated signal sources 37*a* through 37*h* from the quiescent voltage output states thereof to zero voltage states as is the case with the gated logic signal circuits 11*a* through 11*f* of FIG. 1. With this approach, the logic signals from gated signal sources 37*a* through 37*e* are applied as the five inputs to five input AND gate circuit 38 for developing an output which is applied in cascade fashion as one of four inputs to four input AND gate 39. The other three inputs to AND gate 39 are those from gated signal sources 37*f* through 37*h*. In developing a no-warn output from the system of FIG. 2, please note that the pulse signal output when present in the output from the five input AND gate 38 is in time synchronous with the gated pulses of the gated signal sources 37*a* through 37*h*. This cascaded relation of DC logic handling fail-safe pulsed logic AND gate circuits as illustrated with the input AND gate circuits 38 and 39 provides a good method of providing such logic warning indicative protection for DC logic circuitry with a higher number of perimeters being monitored. It is an approach with circuit requirements within reasonable component value perimeter factors and tolerances in providing highly acceptable levels of reliability and long performance life with the warning capabilities required.

Whereas this invention is here illustrated and described with respect primarily to a single embodiment thereof, it should be realized that various changes may be made without departing from the essential contributions to the art made by the teachings hereof.

We claim:

1. A fail-safe means for monitoring the presence of a plurality of like voltage logic input signals, comprising a plurality of input switching means, a plurality of load members, each of said input switching means being serially connected with an associated one of said plurality of load members between first and second common junctions, each of said input switching means being closed in response to application of an associated one of said plurality of logic input signals, to provide a direct current voltage path between said first and second common junctions, whereby the direct current load between said first and second common junctions is dependent upon the collective operational states of said plurality of input switching means, means for periodically pulsing said input signals at a predetermined duty cycle as applied to said plurality of input switching means, output switching means, said output switching means being responsive to the load established between said first and second common junctions with each of said plurality of input switching means being closed to exhibit a first operational state, said output switching means being responsive to the load defined between said first and second common junctions with each of said plurality of input switching means being open to exhibit a second operational state, said output switching means being responsive to any one of said plurality of input switching means being in a position unlike that of any other one of said plurality of input switching means to remain in one of said output switching means first and second operational states, warning indication means, said last defined static condition of said output switching means comprising an enabling output to said warning indication means.

2. A fail-safe monitoring means as defined in claim 1 wherein said output switching means comprises a constant current source, a load means for said constant current source, said current source load means comprising at least said load defined between said first and second common junctions, said output switching means comprising transistor switching means responsive to the voltage developed across said current source load means to exhibit first and second conductivity states corresponding respectively to said output switching means first and second operational states.

3A monitoring means as defined in claim 2 wherein said means for periodically pulsing said input signal to said plurality of input switching means comprises a plurality of gating means, each said logic input signal being applied through an associated one of said plurality of gating means to an associated one of said input switching means, and means for simultaneously enabling each of said plurality of gating means at a predetermined periodic rate.